United States Patent
Teranishi et al.

(10) Patent No.: US 7,011,913 B2
(45) Date of Patent: Mar. 14, 2006

(54) REFFLECTIVE FILM AND METHOD FOR MAKING REFLECTIVE FILM (75) Inventors: Tomoko Teranishi, Ikoma (JP); Sayuri Fujiwara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 445 days.

(21) Appl. No.: 10/216,211

(22) Filed: Aug. 12, 2002

(65) Prior Publication Data

US 2003/0032690 A1 Feb. 13, 2003

(30) Foreign Application Priority Data

Aug. 10, 2001 (JP) ........................................ 2001-243390

(51) Int. Cl.
*C08K 19/00* (2006.01)
*C08F 2/46* (2006.01)

(52) U.S. Cl. .................. 430/20; 299/299.3; 299/299.7; 299/200.1; 522/1; 428/1.1; 428/1.2; 428/1.31; 427/496; 427/508; 427/163.3; 427/163.4; 427/162

(58) Field of Classification Search ...................... 522/1; 252/299.01, 299.6, 299.7, 299.3, 299.1; 428/1.1, 428/1.2, 1.31; 430/20; 427/496, 508, 162, 427/163.3, 163.4, 492, 504
See application file for complete search history.

(56) References Cited

U.S. PATENT DOCUMENTS

| 6,099,758 A | 8/2000 | Verrall et al. |
| 6,217,948 B1 * | 4/2001 | Verrall et al. ............... 427/492 |
| 6,319,963 B1 | 11/2001 | Coates et al. |
| 6,344,885 B1 * | 2/2002 | Mori et al. .................... 349/44 |

OTHER PUBLICATIONS

Kozachenko and Kutulya, "Multicolor Texture Formation in Reflective Cholesteric Displays", SID, pp. 272–275 (2000).
Broer et al, "Wide–band reflective polarizers from cholesteric polymer networks with a pitch gradient", Nature 378:467–469 (1995).

* cited by examiner

*Primary Examiner*—James J. Seidleck
*Assistant Examiner*—Sanza L. McClendon
(74) *Attorney, Agent, or Firm*—Nixon & Vanderhye P.C.

(57) ABSTRACT

A method of making a reflective film includes the steps of: (a) preparing a cholesteric mixture that includes a cholesteric liquid crystal material and at least one type of polymerizable compound; (b) forming a cholesteric mixture layer in which the cholesteric liquid crystal material forms a helical structure, having continuously changing helical pitches, approximately along a normal to the layer; and (c) exposing the cholesteric mixture layer to an actinic ray at a temperature, at which the cholesteric mixture exhibits a cholesteric phase, thereby polymerizing the at least one type of polymerizable compound. In this method, a Tni point of the cholesteric mixture increases by performing the step (c).

10 Claims, 6 Drawing Sheets

FIG.1

UNPOLYMERIZED        POLYMERIZED

FIG.2

LIQUID CRYSTALLINE        NON-LIQUID CRYSTALLINE
MATERIAL                  MATERIAL

REFFLECTIVE FILM AND METHOD FOR MAKING REFLECTIVE FILM

BACKGROUND OF THE INVENTION

1. Field of the Invention

The present invention relates to a reflective film formed by using a cholesteric mixture and a method of making such a reflective film. The present invention also relates to a display device including such a reflective film.

2. Description of the Related Art

A reflective film of the type utilizing the selective reflection characteristics of a helical structure that is formed by a cholesteric liquid crystal material has been known in the art. The wavelength λ of selective reflection of a reflective film like this is obtained by multiplying together the refractive index n of a cholesteric liquid crystal material and the helical pitch P of its helical structure. That is to say, λ≈n×P. This selective reflection is observed in either right-handed circularly polarized light or left-handed circularly polarized light. Accordingly, by using a stack of two reflective films for reflecting right-handed circularly polarized light and left-handed circularly polarized light, respectively, the reflected light can be utilized highly efficiently. Thus, by utilizing the reflection characteristics of the helical structure formed by a cholesteric liquid crystal material, a polarizer of a polarization separation type, a color separation film (i.e., polarizing color filter) and a reflective liquid crystal display device including such a polarizer or color separation film have been developed.

However, the wavelength range of incoming light that is selectively reflected by a cholesteric layer (which will be herein referred to as a "selective reflection wavelength range Δλ") heavily depends on the refractive index anisotropy Δn of the material for the cholesteric layer. Accordingly, it has been difficult to arbitrarily control the selective reflection wavelength range Δλ or to realize a broad selective reflection wavelength range Δλ.

To overcome this problem, Broer et al. proposed a technique of forming a cholesteric layer having continuously changing helical pitches P in Nature, Vol. 378, 467 (1995). By taking advantage of this technique, Merck & Co., Inc. produces an optical element "Transmax" that realizes polarization separation over the entire wavelength range of visible radiation. The technique of forming such a cholesteric layer broadens the selective reflection wavelength range by utilizing the phenomenon that the helical pitch of a cholesteric layer changes continuously with the concentration distribution of a polymerizable compound as measured vertically to the surface of the layer (i.e., in the thickness direction of the layer). The concentration distribution of the polymerizable compound is formed by the diffusion of the molecules of the polymerizable compound while the cholesteric layer is being formed by the ploymerization of the polymerizable compound.

As used herein, the "cholesteric liquid crystal material" means any liquid crystal material that exhibits a cholesteric phase. Thus, the "cholesteric liquid crystal material" includes not only a cholesteric liquid crystal in a narrow sense but also a mixture of a nematic liquid crystal material and a chiral agent. A material that can be used to form a reflective film according to the present invention exhibits both a cholesteric phase and polymerizability. Typically, the material includes a polymerizable compound, a compound such as a polymerization initiator and so on in addition to the cholesteric liquid crystal material. Thus, such a material that includes the cholesteric liquid crystal material and exhibits polymerizability will be herein referred to as a "cholesteric mixture". It should be noted that if the cholesteric liquid crystal material itself includes a polymerizable compound, then the cholesteric mixture may consist essentially of the cholesteric liquid crystal material alone. Also, a layer that has a helical structure formed by the cholesteric liquid crystal material and that is obtained by polymerizing the polymerizable compound of a cholesteric mixture will be herein referred to as a "cholesteric layer".

However, the present inventors discovered and confirmed via experiments that even when a cholesteric layer was formed by using such a polymerizable compound, the cholesteric layer sometimes had an insufficiently high reflectance due to the creation of an excessive number of domains in the cholesteric layer. The present inventors also discovered that such a cholesteric layer sometimes failed to broaden the selective reflection wavelength range sufficiently because of a very small variation in the helical pitch of its helical structure.

SUMMARY OF THE INVENTION

In order to overcome the problems described above, the present invention provides a reflective film that can selectively reflect incoming light at a sufficiently high reflectance in a broad enough wavelength range and also provides a method of making such a reflective film.

The present invention provides a method of making a reflective film. The method preferably includes the steps of: (a) preparing a cholesteric mixture that includes a cholesteric liquid crystal material and at least one type of polymerizable compound; (b) forming a cholesteric mixture layer in which the cholesteric liquid crystal material forms a helical structure, having continuously changing helical pitches, approximately along a normal to the layer; and (c) exposing the cholesteric mixture layer to an actinic ray at a temperature, at which the cholesteric mixture exhibits a cholesteric phase, thereby polymerizing the at least one type of polymerizable compound. This method is characterized in that a Tni point (i.e., a nematic-isotropic phase transition temperature) of the cholesteric mixture increases by performing the step (c). Optionally, the cholesteric liquid crystal material may include the at least one type of polymerizable compound. Specifically, the actinic ray may be an ultraviolet ray.

In one preferred embodiment of the present invention, the step (c) preferably includes the step of exposing the cholesteric mixture layer to the actinic ray without decreasing the Tni point of the cholesteric mixture or a difference between the temperature and Tni point of the cholesteric mixture throughout the step (c).

In another preferred embodiment, the step (c) preferably includes the step of causing a variation ΔTni of about 5° C. to about 30° C. in the Tni point of the cholesteric mixture. That is to say, the variation ΔTni is a difference between the Tni point of the cholesteric mixture before the polymerizable compound is polymerized and that of the cholesteric mixture after the polymerizable compound has been polymerized. The variation ΔTni is more preferably about 15° C. or more.

In still another preferred embodiment, the step (c) preferably includes the step of exposing the cholesteric mixture layer to the actinic ray at a temperature that is lower than the Tni point of the cholesteric mixture by about 0.5° C. or more.

In yet another preferred embodiment, the step (c) preferably includes: an initial stage of increasing the Tni point of the cholesteric mixture as the at least one type of polymerizable compound is going to be polymerized; and a late stage of keeping the Tni point of the cholesteric mixture unchanged no matter whether the at least one type of polymerizable compound is still being polymerized or not.

In yet another preferred embodiment, the step (a) preferably includes the step of preparing the cholesteric mixture that includes a non-polymerizable nematic liquid crystal material and a polymerizable chiral agent. Specifically, the polymerizable chiral agent may be a non-liquid crystalline material. Optionally, the cholesteric mixture may include a compound that absorbs the actinic ray so that an intensity distribution of the actinic ray is formed in the thickness direction of the cholesteric mixture layer.

A reflective film according to the present invention is made by the method according to any of the preferred embodiments of the present invention described above.

Specifically, a reflective film according to a preferred embodiment of the present invention preferably includes a cholesteric layer in which a helical structure having continuously changing helical pitches is formed by a cholesteric liquid crystal material approximately along a normal to the layer. In this reflective film, the cholesteric layer preferably has at least one domain within a layer plane. The at least one domain preferably has a density of 25 domains per 100 $\mu$m □ or less.

In one preferred embodiment of the present invention, the reflective film preferably has a reflectance of about 40% or more with respect to incoming light falling within the wavelength range of about 470 nm to about 670 nm.

A display device according to the present invention includes the reflective film according to any of the preferred embodiments of the present invention described above, and a display medium layer that is provided on one side of the reflective film that is closer to an observer. Thus, the display device of the present invention realizes excellent display performance.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

The present inventors carried out an intensive research to observe how a helical structure having continuously changing helical pitches was formed by a polymerization reaction that a cholesteric liquid crystal material, including a polymerizable compound, caused when exposed to an actinic ray. As a result, the present inventors arrived at the following findings. Specifically, the present inventors discovered and confirmed via experiments that the creation of the helical structure or domains depends heavily on the temperatures of the cholesteric liquid crystal material during the polymerization reaction. Thus, the present inventors acquired the basic concept of the inventive method of making a reflective film that includes various conditions (e.g., controlled temperatures) for forming the desired helical structure that can selectively reflect incoming light at a sufficiently high reflectance in a broad enough wavelength range.

The inventive method of making a reflective film includes the steps of: (a) preparing a cholesteric mixture that includes a cholesteric liquid crystal material and at least one type of polymerizable compound; (b) forming a cholesteric mixture layer in which the cholesteric liquid crystal material forms a helical structure, having continuously changing helical pitches, approximately along a normal to the layer; and (c) exposing the cholesteric mixture layer to an actinic ray at a temperature, at which the cholesteric mixture exhibits a cholesteric phase, thereby polymerizing the at least one type of polymerizable compound. In this method, the composition of the cholesteric mixture and the temperature of the cholesteric mixture when the cholesteric mixture layer is exposed to the actinic ray are controlled so that the Tni point of the cholesteric mixture increases by performing the step (c).

The cholesteric mixture may be a mixture of any materials as long as the mixture exhibits a cholesteric phase and includes a polymerizable compound. The polymerizable compound may be either a compound having liquid crystal properties or a chiral agent. Thus, it is not always necessary to prepare a polymerizable compound separately from a cholesteric liquid crystal material. The cholesteric mixture typically includes a non-polymerizable nematic liquid crystal material and a polymerizable chiral agent.

By applying this cholesteric mixture having polymerizability onto a substrate (e.g., glass substrate), for example, a cholesteric mixture layer, in which the cholesteric liquid crystal material forms a helical structure approximately along a normal to the layer, is obtained. At a temperature at which this cholesteric mixture exhibits a cholesteric phase (i.e., at a temperature that is equal to or lower than the Tni point of the cholesteric mixture), the cholesteric mixture layer is exposed to an actinic ray, thereby polymerizing the polymerizable compound. In this manner, the helical structure having helical pitches that change continuously approximately along a normal to the cholesteric mixture layer (or to the surface of the substrate) can be obtained. Also, the cholesteric mixture has its composition controlled so as to have an increased Tni point as the polymerizable compound is going to be polymerized.

By polymerizing the polymerizable compound of the cholesteric mixture in such a manner as to satisfy these conditions, a helical structure, which can selectively reflect incoming light at a sufficiently high reflectance in a broad enough wavelength range, can be formed. A helical structure like this is believed to be formed through the following mechanism.

Specifically, since the polymerization reaction is started at a temperature that is lower than the Tni point of the cholesteric mixture, the polymerization reaction advances while the helical structure is stabilized. As the polymerization reaction proceeds, the polymerizable compound in the cholesteric mixture layer is consumed nonuniformly in accordance with the intensity of the actinic ray. That is to say, the polymerizable compound, existing in a portion of the cholesteric mixture layer that is exposed to the actinic ray at a relatively high intensity, is consumed more quickly, thus forming a concentration gradient of the polymerizable compound in the cholesteric mixture layer. For example, supposing the actinic ray is emitted from a light source that is located over one surface of the cholesteric mixture layer, the closer to that surface of the cholesteric mixture layer, the more quickly the polymerizable compound (typically a polymerizable chiral agent) is consumed. On the other hand, the closer to the opposite surface of the cholesteric mixture layer, the more slowly the polymerizable compound is consumed and the greater the amount of the remaining polymerizable compound that has not been reacted yet. To compensate for such a concentration gradient, the molecules of the polymerizable compound diffuse so that a relatively large amount of polymerizable compound is polymerized near that surface of the cholesteric mixture layer and that a relatively small amount of polymerizable compound is polymerized near the opposite surface. Thus, the resultant helical structure has helical pitches that change continuously approximately along a normal to the surface of the cholesteric layer.

On the other hand, the diffusion of those polymerizable compound molecules disturbs the helical structure, thereby forming a great number of domains in the cholesteric mixture layer. Those domains will be left even in the resultant cholesteric layer. In that case, the incoming light is likely scattered due to a difference in refractive index between the domains, thus decreasing the reflectance. Accordingly, an excessive number of domains should not be formed.

In a preferred embodiment of the present invention, however, the cholesteric mixture is prepared so as to have its Tni point increased as the polymerizable compound is going to be polymerized. Accordingly, as the polymerization reaction proceeds, the helical structure of the cholesteric mixture layer gets more and more stabilized. Then, it is possible to prevent the diffusing molecules of the polymerizable compound from disturbing the helical structure of the cholesteric mixture layer. As a result, not so many domains should be formed in the cholesteric mixture layer.

To fully achieve these effects caused by the stabilized helical structure, the Tni point of the cholesteric mixture should not decrease throughout the period in which the polymerization reaction proceeds. Also, when the polymerization reaction is started (i.e., when the cholesteric mixture layer starts to be exposed to the actinic ray), the temperature of the cholesteric mixture layer is preferably at least about 0.5 ° C. lower than the Tni point of the cholesteric mixture yet to be polymerized.

However, if the Tni point of the cholesteric mixture is increased too much through the polymerization reaction, then the resultant helical structure will get stabilized excessively. In that case, the diffusion of the polymerizable compound might be obstructed and the desired helical structure having continuously changing helical pitches might not be obtained. The present inventors discovered and confirmed via experiments that such an unwanted phenomenon is avoidable by limiting the increase in the Tni point due to the polymerization reaction. Specifically, according to a preferred embodiment of the present invention, the variation $\Delta$Tni between the Tni point of the cholesteric mixture yet to be polymerized (i.e., before the cholesteric layer is formed) and that of the cholesteric mixture that has already been polymerized (i.e., after the cholesteric layer has been formed) is preferably about 5° C. to about 30° C. It should be noted that to form the cholesteric layer, not all of the polymerizable compound thereof has to be polymerized. That is to say, as long as the desired sufficiently stabilized helical structure can be formed, a portion of the polymerizable compound may be left unreacted. The amount of the unreacted polymerizable compound is changeable with the particular composition of the cholesteric mixture (i.e., the type and weight of the compound).

To control the diffusion rate of the polymerizable compound molecules as described above, the process step of forming the cholesteric layer by polymerizing the polymerizable compound in the cholesteric mixture preferably includes: an initial stage of increasing the Tni point of the cholesteric mixture as the polymerizable compound is going to be polymerized; and a late stage of keeping the Tni point of the cholesteric mixture unchanged no matter whether the polymerizable compound is still being polymerized or not. That is to say, in the cholesteric mixture used in a preferred embodiment of the present invention, oligomers are preferably produced in such numbers as to be diffusible in the cholesteric mixture layer and almost all of the variation $\Delta$Tni is preferably caused by the polymerization of the polymerizable compound in the initial stage of the polymerization reaction. On the other hand, in the late stage of the polymerization reaction, the Tni point of the cholesteric mixture preferably hardly changes in the preferred embodiment of the present invention. In that case, by controlling the intensity of the actinic ray or the weight of a polymerization initiator at the start of the polymerization reaction and by adjusting the rate and the number of the oligomers that are produced by the polymerizable compound, the diffusion rate of the polymerizable compound can be controlled appropriately.

As used herein, the "polymerization reaction" does not always mean a polymerization reaction in the strict sense that produces a linear polymer but may include the formation of a cross-linked structure. It should be noted that when a cross-linked structure is formed, the size of a molecule increases significantly and the diffusion rate decreases steeply. Accordingly, by controlling the percentage of the cross-linked structure to the overall polymer, the diffusion rate of the polymerizable compound may be adjusted. For example, part or all of the polymerizable chiral agent may be a multi-functional compound. Alternatively, a multi-functional compound (i.e., cross-linker) that can be copolymerized with the polymerizable chiral agent may be mixed.

The actinic ray may be any radiation as long as the actinic ray can polymerize the polymerizable compound. Typically, the actinic ray is an ultraviolet ray. Also, to form a concentration distribution of the polymerizable compound approximately along a normal to the cholesteric mixture layer, a compound that absorbs the actinic ray may be added to the cholesteric mixture if necessary. Furthermore, to increase the polymerization rate, for example, a polymerization initiator may be further added. By adjusting the types and weights of these additives, the diffusion rate of the polymerizable compound can be controlled.

As described above, in the method of making a reflective film according to a preferred embodiment of the present invention, the stability of the helical structure and the diffusion rate of the polymerizable compound can be controlled while striking an adequate balance between them. Thus, a reflective film that can selectively reflect incoming light at a sufficiently high reflectance in a broad enough wavelength range can be obtained. More specifically, the domains to be formed in the cholesteric layer as the reflective film may have a density of 25 domains per 100 $\mu$m $\square$ or less within a layer plane thereof. Thus, a reflectance of about 40% or more is realized. Also, a helical structure having continuously changing helical pitches can be obtained to reflect incoming light falling within the wavelength range of about 470 nm to about 670 nm at a reflectance of about 40% or more.

A reflective film like this realizes sufficiently high optical efficiency. Accordingly, if such a reflective film is applied to a reflective liquid crystal display device that uses a liquid crystal layer as its display medium layer, a brightly displayed image is realized.

Composition of Cholesteric Mixture and Phase Transition Temperature Tni

In a specific example of preferred embodiments of the present invention, the cholesteric mixture for use to make the reflective film includes a polymerizable compound that is polymerized when exposed to an ultraviolet ray (e.g., an i-line, in particular). A chiral nematic liquid crystal material is used as the cholesteric liquid crystal material. In this specific example, the cholesteric mixture has the following composition:

a) non-polymerizable cholesteric liquid crystal material (a mixture of a non-polymerizable nematic liquid crystal material E7 (produced by Merck & Co., Inc.) and dextrorotatory non-polymerizable chiral agent CB15 (produced by Merck & Co., Inc.); Tni=42.5° C.): 63.5 parts by weight;

b) (non-liquid crystalline) polymerizable chiral agent (including dextrorotatory chiral monomer and acrylate having a molecular weight of 363 and Tci of 74.3° C.): 35 parts by weight;

c) cross-linker (diacrylate (having a molecular weight of 590)): 0.5 parts by weight;

d) polymerization initiator (UV-photoinitiator Irgacure 369 (produced by Ciba-Geigy Corporation)): 1 part by weight; and e) UV ray absorbing agent (Tinuvine P (produced by Ciba-Geigy Corporation)): 2 parts by weight with respect to the total weight of a), b), c) and d).

Figure 1:
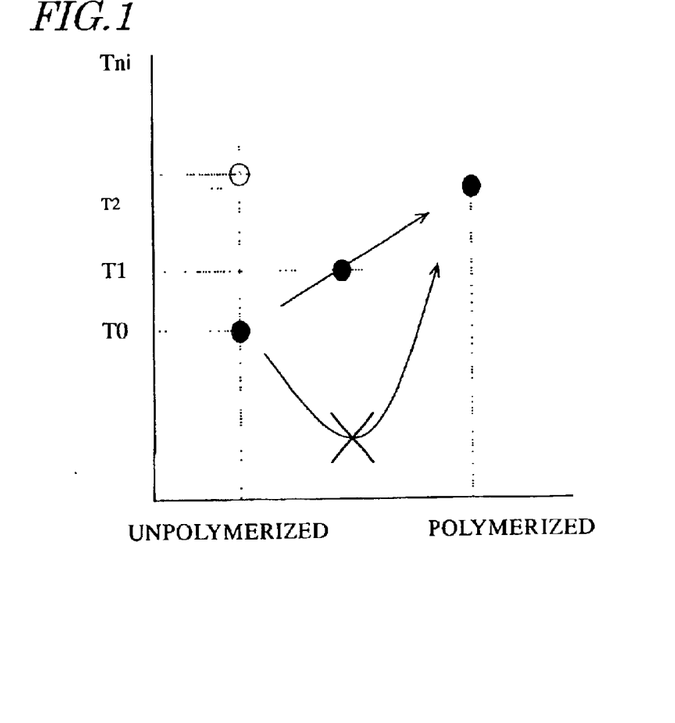
FIG. 1 is a graph schematically showing how the Tni point of a cholesteric mixture for use in a preferred embodiment of the present invention changes with its degree of polymerization.

Hereinafter, it will be described with reference to FIG. 1 how the Tni point of the cholesteric mixture changes with its degree of polymerization. If an acrylate or methacrylate having a molecular weight of about 300 to about 700 is used as the polymerizable chiral agent and a diacrylate or dimethacrylate having a molecular weight of about 300 to about 700 is used as the cross-linker, then substantially the same results as those shown in FIG. 1 can be obtained.

In the cholesteric mixture described above, the non-polymerizable chiral nematic liquid crystal material thereof includes a non-liquid crystalline compound (e.g., a polymerizable compound). However, the cholesteric mixture exhibits a cholesteric phase as a whole. Also, as schematically shown in FIG. 1, as the polymerization reaction advances, the Tni point of the cholesteric mixture goes on rising without decreasing at all. In FIG. 1, the Tni point T1 of the cholesteric mixture being polymerized is higher than the initial Tni point T0 thereof and the Tni point of the completely polymerized cholesteric mixture reaches a point T2 (i.e., T2>T1>T0). The Tni point T2 of the completely polymerized cholesteric mixture is substantially equal to the Tni point T2' of the cholesteric liquid crystal material. The reason is as follows. Specifically, before polymerized, the cholesteric mixture exhibits a single phase. However, as the polymerizable chiral agent, which has been dissolved as an impurity in the cholesteric liquid crystal material, is going to be polymerized into a polymer, phase separation occurs. As a result, the Tni point of the cholesteric mixture becomes closer to the Tni point of the cholesteric liquid crystal material including no polymerizable chiral agent. In the mixture described above, T0=27° C., T2=47° C., T0<T1 is always satisfied, and 5° C.$\leq$T2−T0$\leq$30° C. is also always satisfied. Furthermore, to control the polymerization temperature easily, the initial Tni point T0 of the cholesteric mixture is preferably equal to or higher than room temperature.

Figure 2:
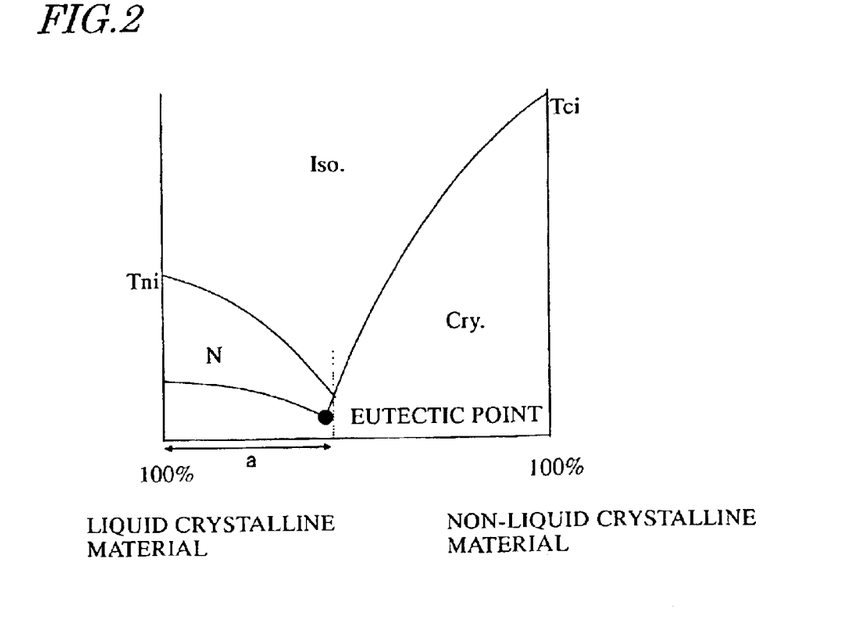
FIG. 2 is a phase diagram showing the composition of a cholesteric mixture (i.e., a mixture of a liquid crystal material and a non-liquid crystalline material) for use in a preferred embodiment of the present invention.

It should be noted that the polymerizable chiral agent is a non-liquid crystalline material (i.e., which exhibit a crystalline phase at temperatures that are lower than its Tci point and an isotropic phase at temperatures that are equal to or higher than its Tci point). Accordingly, as for a mixture of the polymerizable chiral agent and the nematic liquid crystal material, a phase diagram such as that schematically shown in FIG. 2 is obtained. Thus, the cholesteric mixture should have a composition falling within the range a shown in FIG. 2 so that the initial Tni point T0 of the cholesteric mixture yet to be polymerized is lower than the Tni point T2' of the cholesteric liquid crystal material including no polymerizable chiral agent and that the Tni point T1 of the cholesteric mixture being polymerized is always higher than the initial Tni point T0 thereof.

Figure 3:
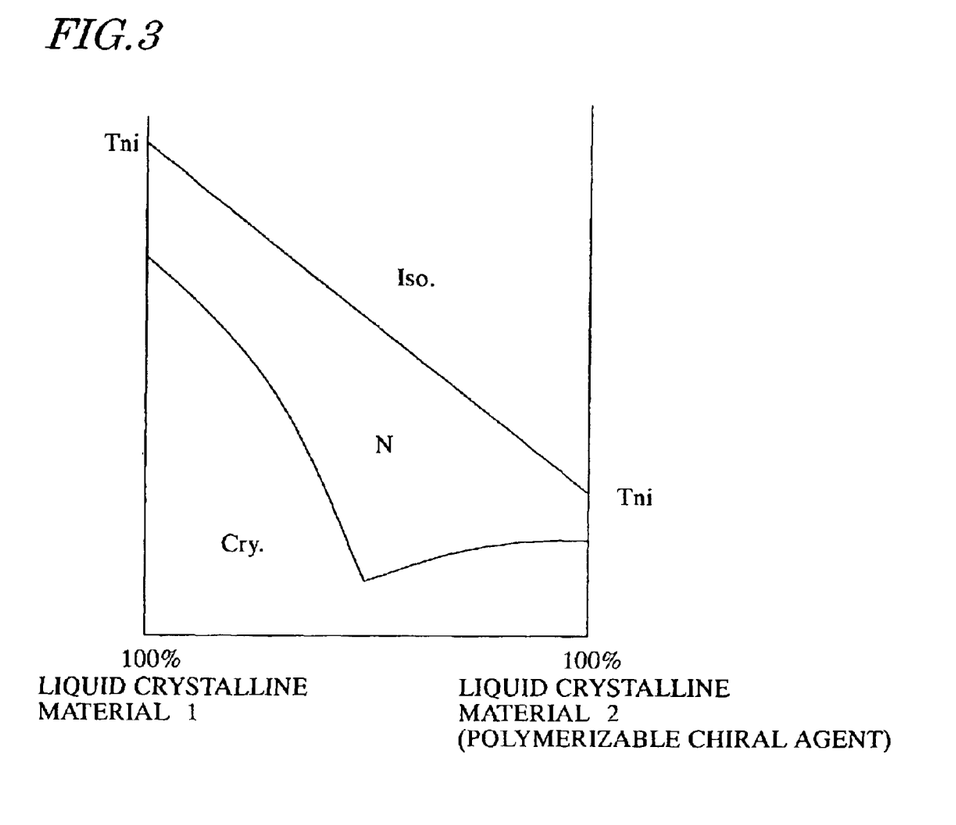
FIG. 3 is a phase diagram showing the composition of another cholesteric mixture (i.e., a mixture of two liquid crystal materials) for use in a preferred embodiment of the present invention.

It should be noted that if a polymerizable chiral agent exhibiting liquid crystal properties is used, then a phase diagram such as that shown in FIG. 3, which is normally obtained for a mixture of two types of liquid crystal materials Nos. 1 and 2, is applied. In that case, to make the Tni point T2 of the completely polymerized cholesteric mixture higher than the initial Tni point T0 of the cholesteric mixture yet to be polymerized, the polymerizable chiral agent with liquid crystal properties to be added should have a Tni point that is lower than that of the cholesteric liquid crystal material.

The cholesteric layer may be formed in the following manner, for example.

First, a cell is prepared by bonding two substrates (e.g., glass substrates) together with a gap of about 10 $\mu$m, for example, left between them. In this case, at least one of the two substrates should transmit the actinic ray (i.e., an ultraviolet ray in this specific example) for use to cause the polymerization reaction. Next, into the gap of this cell, the cholesteric mixture in an isotropic phase (i.e., at a temperature higher than the initial Tni point T0) is injected.

Thereafter, while keeping the temperature equal to or lower than the initial Tni point T0, a cholesteric mixture layer, in which the cholesteric liquid crystal material of the cholesteric mixture forms a helical structure (i.e., cholesteric order) approximately along a normal to the surface of the layer, is formed. It should be noted that the helical structure of the cholesteric liquid crystal material may be controlled along its helical axis by providing two appropriate alignment films (at least one of which is a horizontal alignment film) on the respective inner surfaces of the substrates. In this specific example, horizontal alignment films (e.g., RN 1024 produced by Nissan Chemical Industries, Ltd.) are formed so as to sandwich the cholesteric mixture layer between them.

Subsequently, while a uniform cholesteric order is maintained (i.e., at a polymerization temperature T3 that is lower than the initial Tni point T0), the cholesteric mixture layer is exposed to an ultraviolet ray. In this specific example, the cholesteric mixture layer is exposed to an ultraviolet ray at a polymerization temperature T3 of 25° C. (room temperature) that is lower than the initial Tni point T0 of 27° C. of the cholesteric mixture. It should be noted that the ultraviolet ray is irradiated in a direction that is substantially perpendicular to the surface of the substrate that transmits the ultraviolet ray (i.e., substantially vertically to the cholesteric mixture layer). Also, the ultraviolet ray is irradiated so as to have a uniform illumination distribution on the surface of the layer and a high degree of parallelism. In this specific example, the ultraviolet ray is irradiated at an illuminance of about 0.5 mW/cm$^2$ for approximately 30 minutes.

To sufficiently stabilize the helical structure of the cholesteric mixture yet to be polymerized, the polymerization temperature T3 needs to be lower than the initial Tni point T0 of the cholesteric mixture yet to be polymerized. In this case, the difference between the initial Tni point T0 and the polymerization temperature T3 is preferably equal to or greater than about 0.5° C. (i.e., 0.5° C. ≦T0−T3). This is because otherwise a thermal fluctuation, occurring in the vicinity of the nematic-isotropic phase transition temperature (i.e., the Tni point), might be increased so abnormally as to disturb the helical structure (i.e., the cholesteric order) and decrease the reflectance extremely when the polymerization reaction is started.

Also, the cholesteric mixture is prepared so that the Tni point T1 of the cholesteric mixture being polymerized is always higher than the initial Tni point T0 thereof as described above. Accordingly, if the cholesteric mixture is polymerized at the temperature T3, the relationship T3<T1 is always satisfied. That is to say, the cholesteric mixture can be continuously polymerized without entering the isotropic state on the way and with its helical structure kept stabilized. Furthermore, the helical structure (i.e., the cholesteric order) can be kept so stabilized as not to be disturbed by the diffusion of the polymerizable compound as the polymerization reaction advances.

In this specific example, the cholesteric mixture layer is formed in the gap of a cell that has been prepared beforehand. Accordingly, the polymerization reaction is not inhibited by oxygen. However, there is no need to use the cell if measures are taken in advance to prevent oxygen from inhibiting the polymerization reaction. For example, the cholesteric mixture layer on the surface of a substrate may be polymerized within a nitrogen atmosphere. Alternatively, the cholesteric mixture layer that has been formed on (e.g., applied onto) the surface of a substrate may be covered with a glass sheet that transmits an ultraviolet ray and visible radiation so that the surface of the cholesteric mixture layer will not be exposed to oxygen. It is naturally possible to utilize a polymerization reaction that is not inhibited by oxygen.

Structural Control Over Cholesteric Layer

The present inventors made a number of reflective films by using cholesteric mixtures with various compositions under various temperature conditions and analyzed the structures and optical properties (i.e., regular reflection characteristics) of the resultant reflective films. Based on the findings that the present inventors made as a result of this structural analysis, the present inventors believe that the structure having continuously changing helical pitches should be formed through the following mechanism that will be described with reference to FIG. 4.

Figure 4:
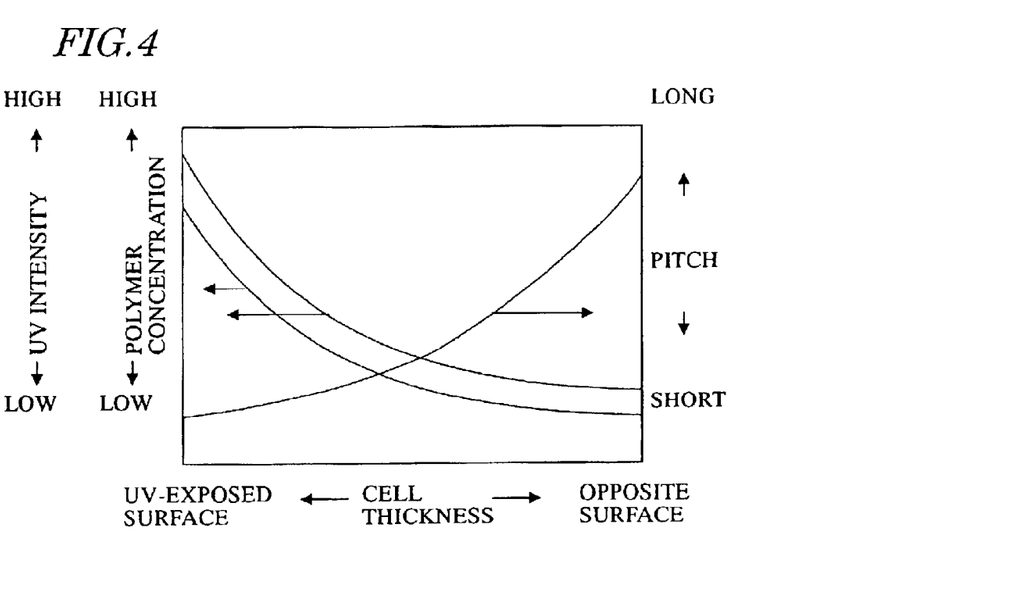
FIG. 4 schematically shows a mechanism through which a cholesteric layer having continuously changing helical pitches is formed in a preferred embodiment of the present invention.

FIG. 4 is a graph schematically showing the respective distributions of ultraviolet ray intensity, polymer concentration and helical pitch in the cholesteric mixture layer. In FIG. 4, the abscissa indicates the position in the thickness direction of the cell. Specifically, the leftmost abscissa represents a position on the surface of the cell that is exposed to the ultraviolet ray, while the rightmost abscissa represents a position on the opposite surface of the cell.

When an ultraviolet ray is irradiated vertically onto one of the surfaces of the cholesteric mixture layer, the polymerizable chiral agent starts to polymerize. The amount of the polymerizable chiral agent that is consumed per unit time is proportional to the intensity of the ultraviolet ray. Accordingly, the concentration distribution of the polymerizable chiral agent, which was uniform before the cholesteric mixture layer was exposed to the ultraviolet ray, becomes non-uniform as the ultraviolet ray intensity distribution shown in FIG. 4 is formed. The distribution of the ultraviolet ray intensity in the thickness direction is formed because the cholesteric mixture absorbs the ultraviolet ray. If necessary, an ultraviolet ray absorbing agent may be added as described above.

To compensate for the imbalance in the concentration that is gradually formed as the polymerization reaction advances, the polymerizable chiral agent diffuses. As a result, the closer to the surface exposed to the ultraviolet ray, the greater the amount of the polymerizable chiral agent consumed (i.e., polymerized). On the other hand, the more distant from the surface exposed to the ultraviolet ray, the smaller the amount of the polymerizable chiral agent consumed. Thus, the present inventors believe that a continuously changing concentration distribution, in which the polymerizable chiral agent that has been polymerized has a relatively high concentration near the surface exposed to the ultraviolet ray and has a relatively low concentration near the opposite surface, should be formed in this manner in the resultant cholesteric layer. When the polymerizable chiral agent has such a concentration distribution, the pitch of the helical structure is relatively short near the surface exposed to the ultraviolet ray but is relatively long near the opposite surface.

Thus, it can be seen that the conditions for the diffusing polymerizable chiral agent forming such a concentration distribution should be maintained during the polymerization process.

On the other hand, if the polymerizable chiral agent diffuses excessively, then the alignment order of the cholesteric liquid crystal molecules, which form the helical structure, is disturbed, thereby forming a great number of domains. The domains that have been formed in this manner are distributed non-uniformly along the axis of the helical structure. Thus, if there are a great number of domains in the cholesteric layer, then the overall regular reflectance will decrease. If an even greater number of domains are formed, then the scattering of incoming light due to the difference in refractive index between those domains will dominate the reflection of the light from the helical structure of each of those domains. As a result, the reflectance will decrease steeply. And if a still greater number of domains are formed, then no helical structures exhibiting reflection characteristics will be formed anymore.

Thus, it can be seen that the diffusion of the polymerizable chiral agent during its polymerization process needs to be controlled to such a degree as not to form an excessive number of domains.

The present inventors prepared cholesteric mixtures having various compositions, and analyzed the relationships among the polymerization temperature T3, the Tni point of each of the cholesteric mixtures and its variation with the advancement of the polymerization, and the structure and optical properties of the resultant cholesteric layer. The results of the analysis will be described for the cholesteric mixture of this specific example.

Figure 5:
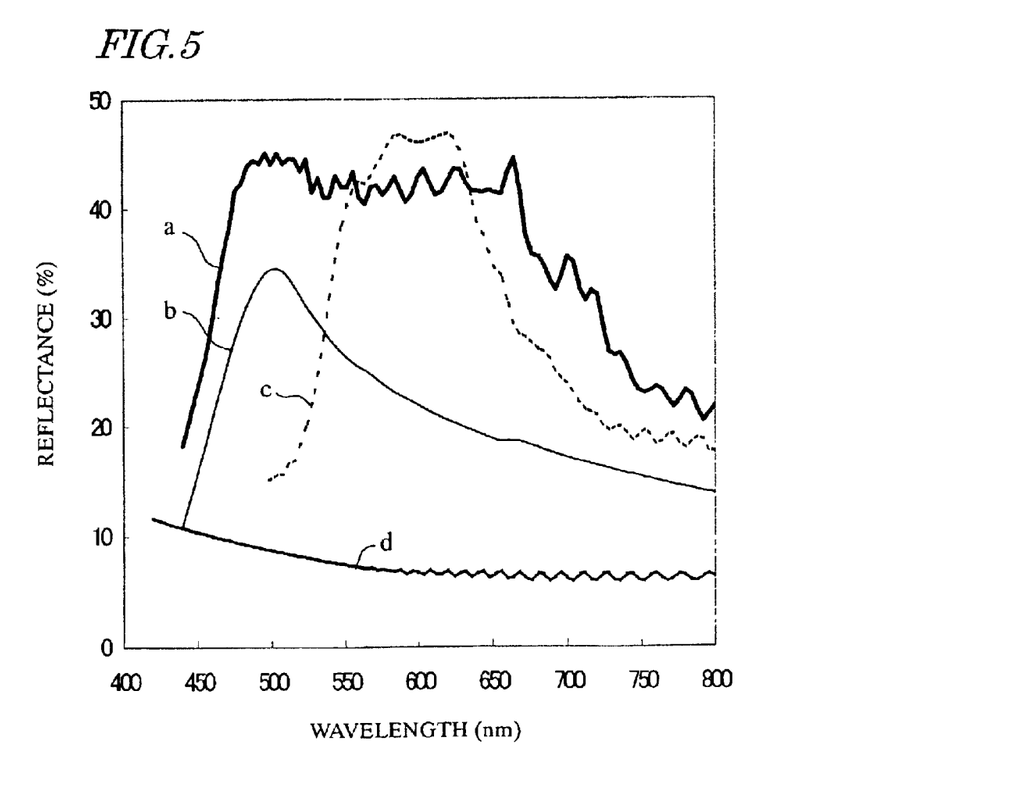
FIG. 5 is a graph showing the spectral reflectance characteristics of various reflective films, which were made under mutually different conditions, by curves a, b, c and d, respectively.

Specifically, the present inventors made a number of different types of reflective films by using the cholesteric mixture described above (of which the Tni point was controlled by adjusting the mixing ratio) at various polymerization temperatures T3. FIG. 5 is a graph showing the spectral reflectance characteristics of the reflective films that were obtained in this manner. In FIG. 5, the curves a, b, c and d represent the spectral reflectances of the reflective films that were made under the conditions including a): T2=47° C., T0=27° C., ΔTni=20° C. and T3=25° C.; b): T2=32° C., T0=18° C., ΔTni=14° C. and T3=16° C.; c) T2=57° C., T0=30° C., ΔTni=27° C. and T3=28° C.; and d) T2=6° C., T0=2° C., ΔTni=4° C. and T3=0° C., respectively.

As indicated by the curve a in FIG. 5, the reflective film that was made under the conditions including T2=47° C., T0=27° C. and T3=25° C. (which will be herein referred to as a "reflective film A" for convenience sake) could have a reflectance of as high as about 40% to about 45% in a broad enough wavelength range of about 470 nm to about 670 nm. In this reflective film A, the relationships T1>T0 and 2° C.≦T1−T3≦22° C. were always satisfied throughout its polymerization process.

As for this reflective film A, the cholesteric mixture is prepared so that the polymerization reaction is started at a temperature that is at least 0.5° C. lower than the initial Tni point T0 of the cholesteric mixture to be polymerized and that the Tni point goes on increasing until the polymerization reaction is completed and that the Tni point T2 of the cholesteric mixture polymerized is 20° C. higher than the initial Tni point T0. Accordingly, in that case, the helical structure can always be kept stabilized and the polymerizable compound can be diffused adequately throughout the polymerization process. As a result, the desired helical structure having continuously changing helical pitches can be obtained, and a reflective film that has a sufficiently high reflectance in a broad enough wavelength range can be obtained because the number of domains formed is not excessive.

Figure 6A:
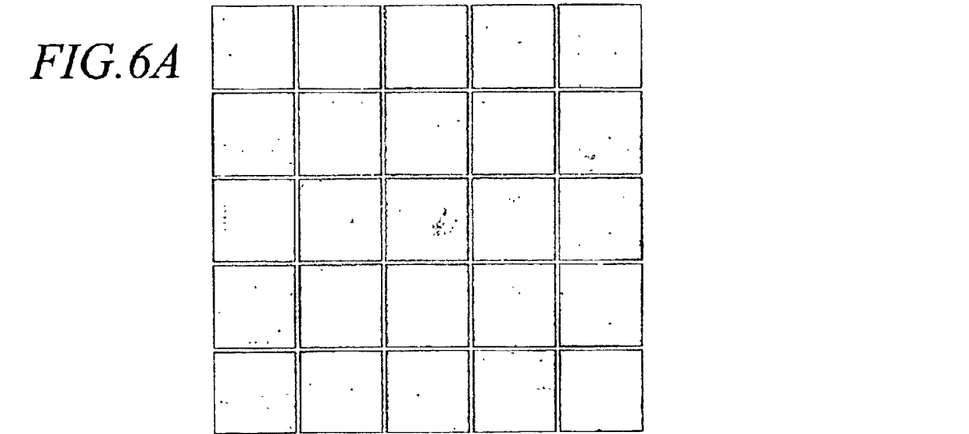
FIGS. 6A, 6B and 6C are optical micrographs of the various reflective films that exhibited the reflectance characteristics represented by the curves a, b and d, respectively.

FIG. 6A is an optical micrograph of the reflective film A, in which each side of each lattice has a length of about 100 μm. As can be clearly seen from FIG. 6A, each domain of the reflective film A was greater than 100 μm▫ (or greater than 500 μm▫ in this example). Thus, it was confirmed that a substantially mono-domain cholesteric layer was formed.

On the other hand, a reflective film that was made in a similar manner from a cholesteric mixture with such a composition as resulting in T2=32° C., T0=18° C. and T3=16° C. (which will be herein referred to as a "reflective film B" for convenience sake) had spectral reflectances as indicated by the curve b in FIG. 5. As shown in FIG. 5, the reflective film B showed reflectances in a broad wavelength range but its reflectances in the range of about 470 nm to about 670 nm were about 18% to about 35%, which were lower than those of the reflective film A. In this reflective film B, the relationships T1>T0 and 2° C.≦T1−T3≦16° C. were always satisfied throughout its polymerization process.

Figure 6B:
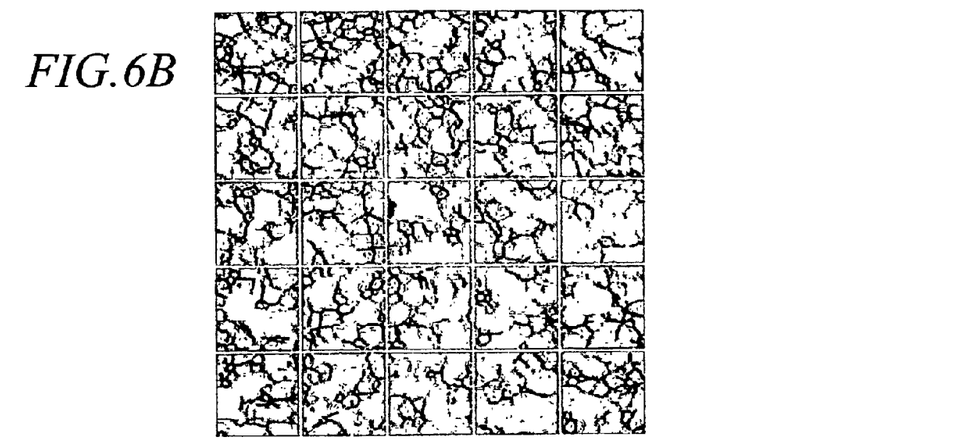

FIG. 6B is an optical micrograph of the reflective film B. As shown in FIG. 6B, 25 domains were formed in average inside 100 μm▫. It is believed that the reflectance decreased due to the creation of these domains.

More specifically, the reasons why the reflectance decreased are believed to be as follows. In the reflective film B, the difference ΔTni between the initial and final Tni points T0 and T2 was 14° C., which was smaller than that (i.e., 20° C.) of the reflective film A, and the differences between the polymerization temperature T3 and the respective Tni points during the polymerization process were also relatively small. Accordingly, the helical structure (i.e., the cholesteric order) of the reflective film B should have been disturbed more easily by the diffusion of the polymerizable compound. Consequently, in the reflective film B, a greater number of domains should have been formed and the reflectance should have decreased as compared with the reflective film A. Thus, it can be seen that the difference ΔTni between the final and initial Tni points T2 and T0 should preferably be 15° C. or more to obtain a high reflectance. Although the reflectances of the reflective film B are somewhat lower than those of the reflective film A, even the reflective film B may be used sufficiently effectively depending on the intended application. It should be noted, however, that once the density of domains in a reflective film exceeds 25 domains per 100 μm▫, the reflectance further decreases too much to use the reflective film in actual applications. For example, a reflective film having a domain density of 50 domains per 100 μm▫ has a reflectance that is far lower than that of the reflective film B, and cannot be used for a display device.

Furthermore, a reflective film that was made in a similar manner from a cholesteric mixture with such a composition as resulting T2=57° C., T0=30° C. and T3=28° C. (which will be herein referred to as a "reflective film C" for convenience sake) had spectral reflectances as indicated by the curve c in FIG. 5. As shown in FIG. 5, the reflective film C had sufficiently high reflectances of about 40% to about 45% or more, but its selective reflection wavelength range was from about 550 nm to about 635 nm, which was narrower than that of reflective film A. In this reflective film C, the relationships T1>T0 and 2° C.≦T1−T3≦29° C. were always satisfied throughout its polymerization process.

The reasons why the selective reflection wavelength range narrowed are believed to be as follows. Specifically, in the reflective film C, the difference ΔTni between the initial and final Tni points T0 and T2 was 27° C., which was greater than that (i.e., 20° C.) of the reflective film A, and the differences between the polymerization temperature T3 and the respective Tni points T1 during the polymerization process were also relatively great. Accordingly, it is believed that the resultant very stabilized helical structure (or cholesteric order) should have inhibited the polymerizable compound from diffusing, thus narrowing the range of the concentration distribution of the polymerizable compound in the thickness direction and changing the helical pitched much less continuously. Thus, it can be seen that the difference ΔTni between the final and initial Tni points T2 and T0 should preferably be 25° C. or less to broaden the selective reflection wavelength range almost to the entire visible radiation range. Although the selective reflection wavelength range of the reflective film C is somewhat narrower than that of the reflective film A, even the reflective film C may be used sufficiently effectively depending on the intended application. It should be noted, however, that if T2−T0>30° C., the reflection spectrum hardly changed even after the polymerization and the selective reflection wavelength range did not broaden at all.

Furthermore, a reflective film that was made in a similar manner from a cholesteric mixture with such a composition as resulting T2=6° C., T0=2° C. and T3=0° C. (which will be herein referred to as a "reflective film D" for convenience sake) had spectral reflectances as indicated by the curve d in FIG. 5. As shown in FIG. 5, no selective reflection by the helical structure (or cholesteric order) was observed anymore. In this reflective film D, the relationships T1>T0 and 2° C.≦T1−T3≦6° C. were always satisfied throughout its polymerization process.

Figure 6C:
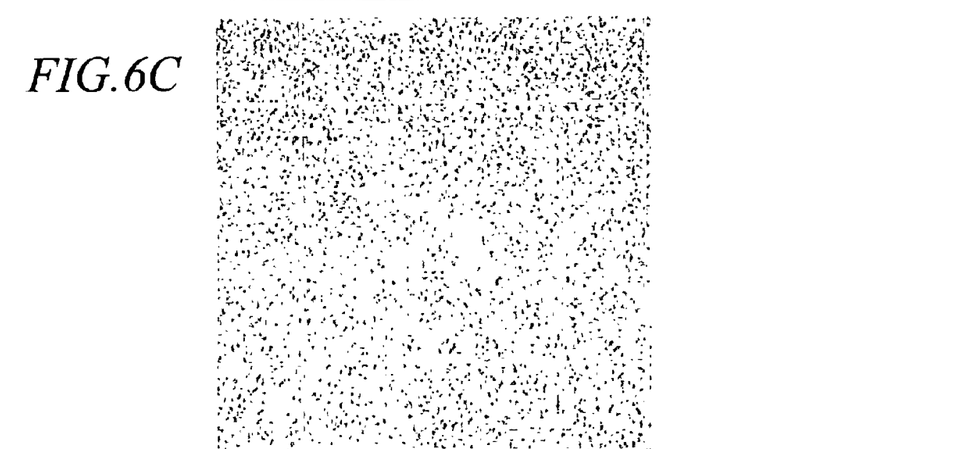

FIG. 6C is an optical micrograph of the reflective film D. As shown in FIG. 6C, 300 domains were formed in average inside 100 μm□. It is believed that the scattering of incoming light between domains should have dominated the selective reflection of the light from the helical structure due to the creation of those domains.

The reasons why the selective reflection was no longer observed are believed to be as follows. Specifically, in the reflective film D, the difference ΔTni between the initial and final Tni points T0 and T2 was as small as 4° C., and the differences between the polymerization temperature T3 and the respective Tni points T1 during the polymerization process were also too small. Accordingly, the helical structure should have been deprived of most of its stability, and the alignment order should have been disturbed considerably, by the diffusion of the polymerizable compound. A great number of domains should have been formed in this manner. Thus, it can be seen that the difference ΔTni between the final and initial Tni points T2 and T0 should preferably be 5° C. or more to prevent an excessive number of domains from being created.

It should be noted that even if the cholesteric mixture does not have a sufficient difference ΔTni between its final and initial Tni points T2 and T0, the helical structure thereof still can be kept stabilized during the polymerization process and the high reflectance and broad selective reflection wavelength range are still realizable by defining the polymerization temperature T3 at a sufficiently low value. However, if the polymerization temperature T3 is too low, then the respective constituents (i.e., respective liquid crystalline compounds) of the liquid crystal material might crystallize so easily as to change the composition of the liquid crystal material unintentionally. For that reason, the polymerization temperature T3 should preferably be higher than the temperature at which the respective constituents of the material yet to be polymerized start to crystallize.

Figure 7:
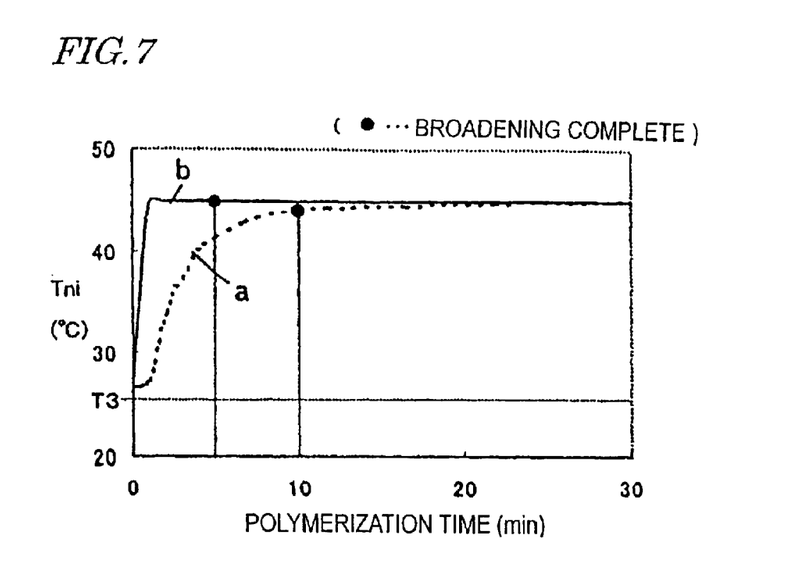
FIG. 7 is a graph schematically showing relationships between the polymerization rate of a cholesteric mixture and the rate at which the Tni point of the cholesteric mixture increases.

Next, the relationship between the polymerization rate and the structure of the cholesteric layer will be described with reference to FIG. 7. FIG. 7 schematically shows variations in the Tni point of the cholesteric mixture with the progress of the polymerization.

When the polymerizable chiral agent starts to polymerize, first, a great number of oligomers (which are also called "pre-polymers") are produced. As the molecular weight of the polymerizable chiral agent increases, the solubility of the polymerizable chiral agent in the cholesteric liquid crystal material decreases and the non-liquid crystalline polymerizable chiral agent, which has been dissolved in the cholesteric liquid crystal material, gradually separates itself from the liquid crystal material. Accordingly, the Tni point of the overall cholesteric mixture becomes closer to the Tni point of the cholesteric liquid crystal material. As a result, the Tni point of the cholesteric mixture increases. At this point in time, the oligomers of the polymerizable chiral agent separated still have so low a molecular weight as to diffuse inside the cholesteric mixture and form a concentration distribution in the cholesteric layer.

In this case, if the weight of the polymerization initiator added is small, for example, then the oligomers may be produced at a low rate until the broad selective reflection wavelength range is established (i.e., until the variation in the selective reflection spectrum converges). In that case, the Tni point will increase at a relatively low rate as indicated by the dashed curve a in FIG. 7. That is to say, the polymerizable chiral agent goes on diffusing until the desired broad selective reflection wavelength range is established (i.e., until the polymerizable chiral agent has grown to be oligomers having too great a molecular weight to diffuse). In this diffusion (or growth) process of the polymerizable chiral agent, the differences between the respective Tni points of the cholesteric mixture and the polymerization temperature T3 may be insufficient. Accordingly, in that case, the helical structure might be deprived of much of its stability, and significantly disturbed by, the diffusing polymerizable chiral agent. Consequently, a great number of domains might be created and the efficiency of selective reflection might decrease.

On the other hand, if the weight of the polymerization initiator added is large, for example, then the oligomers may be produced at a high rate in the polymerization process. In that case, the Tni point will increase at a relatively high rate as indicated by the solid curve b in FIG. 7. That is to say, the polymerizable chiral agent goes on diffusing until the desired broad selective reflection wavelength range is established (i.e., until the polymerizable chiral agent has grown to be oligomers having too great a molecular weight to diffuse). In the meantime, the differences between the respective Tni points of the cholesteric mixture and the polymerization temperature T3 may be excessively great. Accordingly, in that case, the helical structure might be so much stabilized as to inhibit the polymerizable chiral agent from diffusing. Then, the desired concentration distribution of the polymerizable chiral agent might not be formed and the selective reflection wavelength range might be insufficiently broad.

Figure 8:
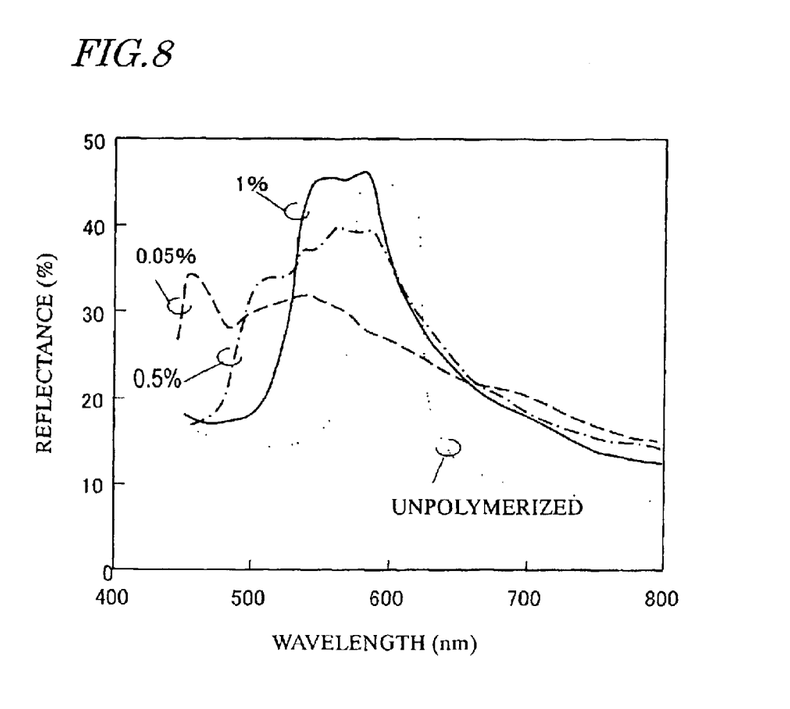
FIG. 8 is a graph showing the spectral reflectance characteristics of various reflective films that were made at respective polymerization rates with the amount of a polymerization initiator added thereto changed.

FIG. 8 is a graph showing the spectral reflectances of a number of reflective films, each of which was formed with the polymerization rate adjusted by changing the weight of the polymerization initiator to be added to the cholesteric mixture. In the example shown in FIG. 8, the cholesteric mixture included a) non-polymerizable cholesteric liquid crystal material at 63.5 parts by weight, b) polymerizable chiral agent at 35 parts by weight, and c) cross-linker at 0.5 parts by weight.

As can be seen from FIG. 8, the smaller the weight of the polymerization initiator added, the broader the reflection spectrum but the lower the reflectance. That is to say, it is believed that when the polymerization initiator was added to a small weight, the Tni point should have increased at a relatively low rate in the polymerization process and the differences between the respective Tni points of the cholesteric mixture being polymerized and the polymerization temperature T3 should have been insufficient. In that case, the helical structure should have been deprived of much of its stability and the diffusion of the polymerizable chiral agent should have been accelerated sufficiently. However, it is also believed that since the helical structure should have been disturbed by the diffusion significantly, a great number of domains should have been created in the cholesteric mixture to decrease the efficiency of selective reflection.

On the other hand, the heavier the weight of the polymerization initiator added, the higher the reflectance but the narrower the reflection spectrum. That is to say, it is believed that when the polymerization initiator was added to a heavy weight, the Tni point should have increased at a relatively high rate in the polymerization process and the differences between the Tni points of the cholesteric mixture being polymerized and the polymerization temperature T3 should have expanded excessively. In that case, the helical structure should have been so stabilized as to increase the reflectance sufficiently. However, it is also believed that since the diffusion of the polymerizable chiral agent should have been inhibited, the desired concentration distribution of the polymerizable chiral agent could not have been formed in the thickness direction and the reflection spectrum could not have been broadened.

Thus, by appropriately adjusting the rate at which the oligomers are produced from the polymerizable chiral agent (or a polymerizable compound in general), i.e., the rate at which the Tni point of the cholesteric mixture increases, an adequate degree of helical structure stability and an adequate degree of diffusion are achieved at the same time. That is to say, if the polymerization rate is adjusted so that the variation in the Tni point of the cholesteric mixture converges at an appropriate stage that is at least before the polymerizable chiral agent is completely polymerized, the oligomers of the polymerizable compound can be diffused sufficiently to such a degree as not to disturb the helical structure. Although the polymerization rate is changeable depending on the type of the polymerizable compound or the number of functional groups thereof, the polymerization rate may be controllable by adjusting the weight of the polymerization initiator added, for example.

In the cholesteric mixture according to the preferred embodiments described above, dextrorotatory materials are used as the polymerizable chiral agent and as the non-polymerizable chiral agent of the non-polymerizable cholesteric liquid crystal material. However, the present invention is not limited to these specific preferred embodiments, but levorotatory chiral agents may also be used according to the present invention. Also, the non-polymerizable chiral agent may or may not have to be added depending on the helical twist power of the polymerizable chiral agent or the distribution of the helical pitches defined, for example. Also, if the cholesteric liquid crystal material adopted includes a chiral component and a polymerizable functional group in its molecule, then the polymerizable chiral agent may be omitted. To select a material from a broad enough range and to control the polymerization rate and the Tni increase rate as easily as possible, however, a polymerizable chiral agent and a non-polymerizable cholesteric liquid crystal material are preferably used in combination as described above.

In this case, the respective transition temperatures (i.e., the Tni and Tci points) of the non-polymerizable cholesteric liquid crystal material and the polymerizable chiral agent are a key factor to be considered in selecting appropriate materials as described above. However, their molecular structures are no less important than the transition temperatures are. That is to say, after the polymerizable chiral agent has started to be polymerized and before the chiral agent finishes being polymerized, the polymerizable chiral agent needs to have an adequate intermolecular force on the non-polymerizable cholesteric liquid crystal material and also needs to exhibit a stabilized cholesteric phase and a stabilized helical structure.

That is to say, if a combination of a polymerizable chiral agent and a cholesteric liquid crystal material adopted results in a significant variation in the intermolecular force of the polymerizable chiral agent on the cholesteric liquid crystal material when a microscopic phase separation is caused by the polymerization of the polymerizable chiral agent, then the polymerizable chiral agent cannot diffuse inside the cholesteric mixture layer having a stabilized helical structure.

Figure 9A:
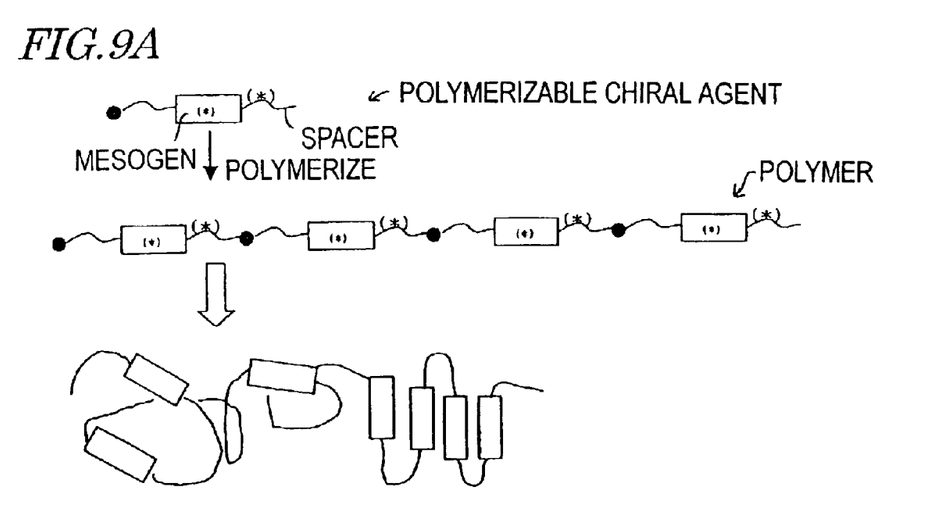
FIGS. 9A and 9B schematically show the relationships between the molecular structure of a polymerizable chiral agent and the stability of the helical structure of a resultant polymer.
Figure 9B:
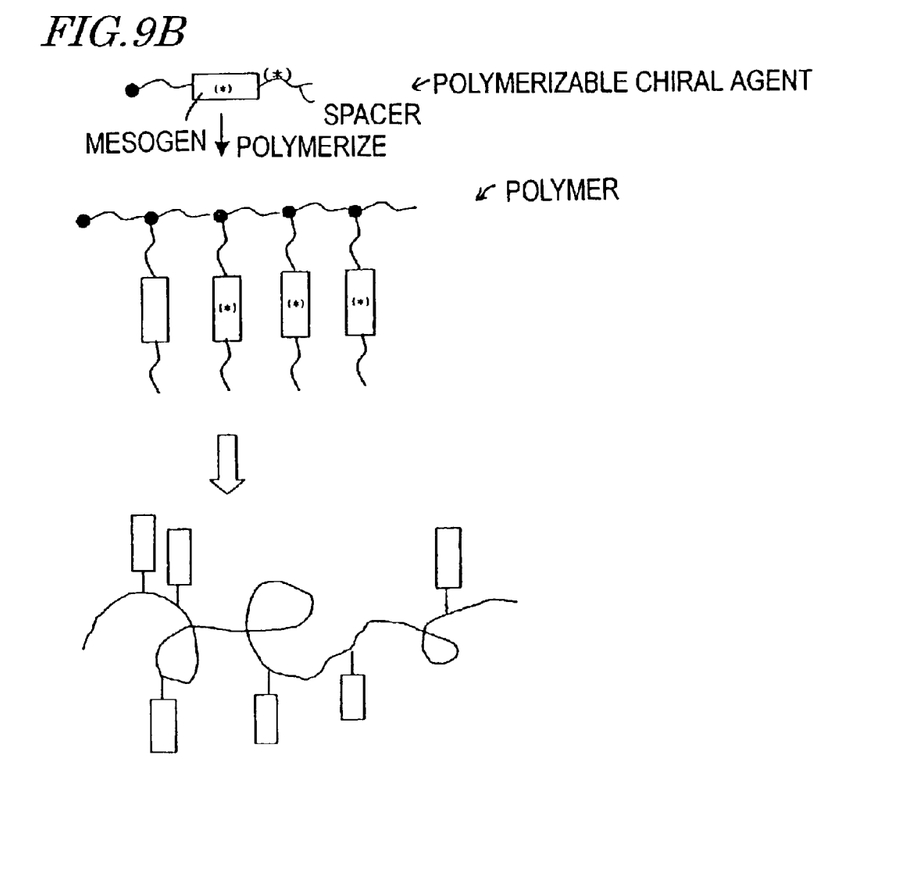

The polymerizable chiral material may have a molecular structure such as that schematically shown in FIG. 9A or 9B. In the molecular structure shown in FIG. 9A, chiral groups are introduced into the main chains of the polymerized polymer in which asymmetric carbon atoms are indicated by *. In the molecular structure shown in FIG. 9B on the other hand, chiral groups are introduced into the side chains of the polymerized polymer, and asymmetric carbon atoms (also indicated by *) may exist in either mesogen groups or spacer groups.

In the molecular structure shown in FIG. 9A in which the chiral groups exist in the main chains of the polymer, the structure-stabilizing motion of the main chains hinders the intermolecular interaction between the polymer and the non-polymerizable cholesteric liquid crystal material, thereby decreasing the intermolecular force and making the twist power of the chiral groups ineffective. Thus, it is unlikely that the desired stabilized helical structure is formed.

On the other hand, in the molecular structure shown in FIG. 9B in which the chiral groups exist in the side chains of the polymer, the side chains can move independently of the stabilizing motion of the main chains. Accordingly, the intermolecular interaction is maintained between the non-polymerizable cholesteric liquid crystal material and the polymer, the intermolecular force does not decrease, and the twist power is effectively exerted by the chiral groups. Thus, the desired stabilized helical structure is likely formed.

For that reason, to broaden the selective reflection wavelength range, a polymerizable chiral agent that can introduce chiral groups into the side chains of a polymer is preferably used. A preferred polymerizable chiral agent typically produces side-chain-type polysiloxane or side-chain-type polyacrylate. Furthermore, to stabilize the helical structure (i.e., cholesteric order), the molecule of the polymerizable chiral agent preferably includes a group of atoms that can exert intermolecular force of an appropriate magnitude on the non-polymerizable cholesteric material. Examples of such groups include (a), (b) and (c) represented by the following chemical formulae:

-continued

X;F, CN
n = 1~3

The cross-linker such as a multi-functional acrylate is added to stabilize the helical structure of the resultant cholesteric layer, and may be omitted. However, when the cross-linker is added, the polymerization rate (i.e., phase separation rate or Tni increase rate) can be adjusted.

The UV ray absorbing agent (or UV ray absorbing pigment) is added to create an ultraviolet ray intensity distribution in the cholesteric mixture layer. If any other material has the UV ray absorbing function, the UV ray absorbing agent may be omitted.

The other materials of the cholesteric mixture may also be replaced with alternative materials having similar functions and are not particularly limited. The composition (or mixing ratio) of the cholesteric mixture is not limited to the exemplified one, either.

Where a polymerizable chiral agent is used as the polymerizable compound as in the preferred embodiment described above, the nematic liquid crystal material may be mixed at about 10 wt. % to about 90 wt. %, the non-polymerizable chiral agent may be mixed at about 0 wt. % to about 75 wt. %, the polymerizable chiral agent may be mixed at about 2 wt. % to about 75 wt. %, diacrylate may constitute about 0 wt. % to about 10 wt. % of the mixture of these materials, the polymerization initiator may be added if necessary at about 0.05 wt. % to about 2 wt. % and the UV ray absorbing agent may constitute about 0 wt. % to about 5 wt. % of the mixture of these materials.

In the preferred embodiments described above, the thickness of the cell (i.e., the thickness of the cholesteric layer) is defined at about 10 μm, but may also be about 0.5 μm or more. The reason is that if the cholesteric layer had a thickness of less than 0.5 μm, then the visible radiation could be utilized much less efficiently. However, the greater the thickness of the cholesteric layer, the higher the drive voltage thereof should be. In that case, if the cholesteric layer is used for an element to be driven by a voltage, the element cannot be driven at a practical voltage. Accordingly, when the cholesteric layer is used for an element to be driven by applying a voltage thereto, the cholesteric layer preferably has a thickness of about 20 μm or less, more preferably about 10 μm or less. However, if the cholesteric layer is used as a reflective film that need not be driven by a voltage, then the thickness of the cholesteric layer has no upper limit.

Various preferred embodiments of the present invention have been described in detail as being applied to a display device including a cholesteric layer that has a structure changing responsive to a voltage applied thereto. Alternatively, preferred embodiments of the present invention are also applicable to any known display device (e.g., a TFT liquid crystal display device). In that case, the weight of the cross-linker to be added, for example, may have only to be adjusted so that the cholesteric layer can respond to an applied voltage in a reversible manner.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method of making a reflective film, the method comprising:
   (a) preparing a cholesteric mixture that includes a cholesteric liquid crystal material and at least one type of polymerizable compound;
   (b) forming a cholesteric mixture layer in which the cholesteric liquid crystal material forms a helical structure, having continuously changing helical pitches, approximately along a normal to the layer;
   (c) exposing the cholesteric mixture layer to an actinic ray at a temperature, at which the cholesteric mixture exhibits a cholesteric phase, thereby polymerizing the at least one type of polymerizable compound,
   wherein a Tni point of the cholesteric mixture increases by performing the step (c);
   wherein the step (a) includes the step of preparing the cholesteric mixture that includes a non-polymerizable nematic liquid crystal material and a polymerizable chiral agent, and the step (c) includes the step of causing a variation ΔTni of about 5 degrees C. to about 30 degrees C. in the Tni point of the cholesteric mixture.

2. The method of claim 1, wherein the step (c) includes the step of exposing the cholesteric mixture layer to the actinic ray without decreasing the Tni point of the cholesteric mixture throughout the step (c) and without decreasing a difference between the temperature and Tni point of the cholesteric mixture throughout the step (c).

3. The method of claim 1, wherein the step (c) includes the step of exposing the cholesteric mixture layer to the actinic ray at a temperature that is lower than the Tni point of the cholesteric mixture by about 0.5° C. or more.

4. The method of claim 1, wherein the step (c) includes:
   an initial stage of increasing the Tni point of the cholesteric mixture as the at least one type of polymerizable compound is going to be polymerized; and
   a late stage of keeping the Tni point of the cholesteric mixture unchanged no matter whether the at least one type of polymerizable compound is still being polymerized or not.

5. A reflective film having a helical structure with continuously changing helical pitches, the reflective film being made by a method that comprises:
   (a) preparing a cholesteric mixture that includes a cholesteric liquid crystal material and at least one type of polymerizable compound;
   (b) forming a cholesteric mixture layer in which the cholesteric liquid crystal material forms the helical structure approximately along a normal to the layer;
   (c) exposing the cholesteric mixture layer to an actinic ray at a temperature, at which the cholesteric mixture exhibits a cholesteric phase, thereby polymerizing the at least one type of polymerizable compound,
   wherein a Tni point of the cholesteric mixture increases by performing the step (c);
   wherein the cholesteric mixture includes a non-polymerizable nematic liquid crystal material and a polymerizable chiral agent, and wherein the Tni point of the cholesteric mixture causes a variation ΔTni of about 5 degrees C. to about 30 degrees C. as a result of the step (c).

6. The reflective film of claim 5, wherein neither the Tni point of the cholesteric mixture nor a difference between the temperature and Tni point of the cholesteric mixture decreases throughout the step (c).

7. The reflective film of claim 5, wherein the cholesteric mixture layer is exposed to the actinic ray in the step (c) at a temperature that is lower than the Tni point of the cholesteric mixture by about 0.5 □ or more.

8. The reflective film of claim 5, wherein the step (c) includes: an initial stage of increasing the Tni point of the cholesteric mixture as the at least one type of polymerizable compound is going to be polymerized; and a late stage of keeping the Tni point of the cholesteric mixture unchanged no matter whether the at least one type of polymerizable compound is still being polymerized or not.

9. The reflective film of claim 5, wherein the reflective film has a reflectance of about 40% or more with respect to incoming light falling within the wavelength range of about 470 nm to about 670 nm.

10. A display device comprising: the reflective film as recited in claim 5; and a display medium layer that is provided on one side of the reflective film that is closer to an observer.

* * * * *